United States Patent
Ge (10) Patent No.: US 9,906,574 B2
(45) Date of Patent: Feb. 27, 2018

(54) METHOD, SERVER, CLIENT AND SYSTEM FOR DATA PRESENTATION IN A MULTIPLAYER SESSION

(71) Applicant: TENCENT TECHNOLOGY (SHENZHEN) COMPANY LIMITED, Guangdong (CN)

(72) Inventor: Xiangwei Ge, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 579 days.

(21) Appl. No.: 14/531,609

(22) Filed: Nov. 3, 2014

(65) Prior Publication Data

US 2015/0058413 A1    Feb. 26, 2015

Related U.S. Application Data

(63) Continuation of application No. PCT/CN2013/075015, filed on Apr. 28, 2013.

(30) Foreign Application Priority Data

May 4, 2012 (CN) .......................... 2012 1 0137255

(51) Int. Cl.
*H04L 12/18* (2006.01)
*H04L 29/06* (2006.01)
(Continued)

(52) U.S. Cl.
CPC .......... *H04L 65/60* (2013.01); *H04L 12/1818* (2013.01); *H04L 65/403* (2013.01);
(Continued)

(58) Field of Classification Search
CPC ... H04L 65/403; H04L 12/1818; H04L 65/60; H04L 67/141; H04N 7/15; H04M 3/567
See application file for complete search history.

(56) References Cited

U.S. PATENT DOCUMENTS

2005/0088514 A1* 4/2005 Deleam ............... H04L 12/1827
                                                       348/14.08
2007/0263824 A1   11/2007 Bangalore et al.
(Continued)

FOREIGN PATENT DOCUMENTS

CN    101141613 A    3/2008
CN    101183961 A    5/2008
(Continued)

OTHER PUBLICATIONS

Office Action Issued in Chinese Patent Application No. 201210137255.3 dated Oct. 18, 2016 in 8 pages.
(Continued)

*Primary Examiner* — Oanh Duong
(74) *Attorney, Agent, or Firm* — Knobbe Martens Olson & Bear LLP (57) ABSTRACT

The present disclosure discloses a method, server, client and system for data presentation in a multiplayer session, and belongs to the technical field of multiplayer video session. The method includes: establishing a session connection with multiple clients participating in the session; receiving session control commands, audio data and video data transmitted by the multiple clients participating in the session through the session connection; assigning audio data and video data to the first client based on the session control commands transmitted by the multiple clients participating in the session, the first client is any one of the multiple clients participating in the session; transmitting the audio data and video data to the first client, so as for the first client to present the audio data and video data. Thus the audio data and video data assigned to the clients are controlled, which can reduce the dependence on network bandwidth, save network traffic, and reduce the performance requirements on
(Continued)

the clients, so that the multiplayer session can cover more users.

13 Claims, 4 Drawing Sheets

(51) Int. Cl.
*H04N 7/15* (2006.01)
*H04L 29/08* (2006.01)
*H04M 3/56* (2006.01)

(52) U.S. Cl.
CPC .............. *H04L 67/141* (2013.01); *H04N 7/15* (2013.01); *H04M 3/567* (2013.01)

(56) References Cited

U.S. PATENT DOCUMENTS

| | | | | |
|---|---|---|---|---|
| 2008/0165708 | A1* | 7/2008 | Moore | H04L 12/1818 370/260 |
| 2008/0233990 | A1* | 9/2008 | Jen | H04L 65/1006 455/518 |
| 2010/0149301 | A1 | 6/2010 | Lee et al. | |
| 2010/0157017 | A1 | 6/2010 | Pepperell | |
| 2010/0310059 | A1* | 12/2010 | Davis | H04M 3/4938 379/88.18 |
| 2012/0077536 | A1* | 3/2012 | Goel | H04L 65/4061 455/518 |
| 2013/0109365 | A1* | 5/2013 | Buzdugan | H04W 76/002 455/416 |
| 2013/0151622 | A1* | 6/2013 | Goel | H04L 12/1822 709/205 |
| 2013/0169742 | A1* | 7/2013 | Wu | H04N 7/152 348/14.08 |

FOREIGN PATENT DOCUMENTS

| | | |
|---|---|---|
| CN | 101427557 A | 5/2009 |
| CN | 101427557 A | 5/2009 |
| CN | 102246458 A | 11/2011 |
| CN | 102265613 A | 11/2011 |
| EP | 1936934 A1 | 6/2008 |
| WO | 2007126652 A2 | 11/2007 |
| WO | 2010074582 A1 | 7/2010 |
| WO | 2010074826 A1 | 7/2010 |

OTHER PUBLICATIONS

International Preliminary Report on Patentability for International Application No. PCT/CN2013/075015 dated Nov. 4, 2014, in 8 pages.
International Search Report for PCT/CN2013/075015 dated Aug. 8, 2013, 2 pages.

* cited by examiner

METHOD, SERVER, CLIENT AND SYSTEM FOR DATA PRESENTATION IN A MULTIPLAYER SESSION

This application is continuation of International Application No. PCT/CN2013/075015, filed on Apr. 28, 2013, which claims the priority of Chinese patent application No. 2012101372553, filed on May 4, 2012, in Chinese Patent Office, entitled "method, server, client and system for data presentation in a multiplayer session", the disclosure of which is incorporated herein by reference in its entirety.

FIELD OF THE DISCLOSURE

The present disclosure relates to the technical field of multiplayer video session, and more particularly, to a method, server, client and system for data presentation in a multiplayer session.

BACKGROUND OF THE DISCLOSURE

With the rapid development of the network technology, a multiplayer video session system has been increasingly widely built and used, which enables users located in a number of areas to transmit sounds and images between each other through deployed clients and transmission lines in order to achieve a real-time and interactive communication, thus conference efficiency is improved, and conference costs are reduced.

In the prior art, each of users participating in a session may utilize multiple clients deployed or utilize multiple small windows of a large screen on the same client to present data transmitted by all of the other users participating in the session. However, this approach will impose a great pressure on network bandwidth, especially when the number of users participating in a session is too large, the pressure on network bandwidth will be more obvious.

SUMMARY OF THE DISCLOSURE

In order to solve above problems in the prior art, the embodiments of the present disclosure provide a method, server, client and system for data presentation in a multiplayer session. The technical solutions described above are as follows:

A method for data presentation in a multiplayer session including:

establishing, by a server, a session connection with multiple clients participating in the session;

receiving, by the server, session control commands, audio data and video data transmitted by the multiple clients participating in the session through the session connection;

assigning, by the server, audio data and video data requested for presentation by a first client to the first client according to the session control commands transmitted by the multiple clients participating in the session, the first client is any one of the multiple clients participating in the session; and transmitting, by the server, the audio data and video data assigned to the first client to the first client, so as for the first client to present the audio data and video data.

The session control commands includes a switching command, accordingly, the assigning video data requested for presentation by the first client to the first client according to the session control commands transmitted by the multiple clients participating in the session includes:

determining at least one second client concerned by the first client according to the switching command transmitted by the first client, the switching command comprises information of the at least one second client concerned currently by the first client, the at least one second client is at least one client in the multiple clients participating in the session other than the first client; and assigning received video data transmitted by the at least one second client to the first client.

The session control commands includes session notification commands, accordingly, the assigning audio data requested for presentation by the first client to the first client according to the session control commands transmitted by the multiple clients participating in the session includes:

determining speaking clients in the multiple clients participating in the session according to the session notification commands transmitted by the multiple clients participating in the session, the session notification commands comprises information indicating whether the clients participating in the session are currently speaking; and selecting clients of which the number is no more than a predetermined value from the speaking clients, and assigning received audio data transmitted by selected clients to the first client.

The selecting clients of which the number is no more than a predetermined value from the speaking clients includes:

determining a concern weight for each of the speaking clients concerned by the first client when the number of the speaking clients is more than the predetermined value; and selecting clients of which the number is no more than the predetermined value from the speaking clients according to concern weights of the speaking clients concerned by the first client.

The determining a concern weight for each of the speaking clients concerned by the first client includes:

for each of the speaking clients, calculating a concern weight based on the number of times that the speaking client is concerned by the first client, a permission level of an operator to which the speaking client belongs, or/and a status hierarchy of the speaking client.

A server including a session connection establishing module, a receiving module, an assigning module and a transmitting module;

the session connection establishing module is configured to establish a session connection with multiple clients participating in a session;

the receiving module is configured to receive session control commands, audio data and video data transmitted by the multiple clients participating in the session through the session connection;

the assigning module is configured to assign audio data and video data requested for presentation by a first client to the first client according to the session control commands transmitted by the multiple clients participating in the session, the first client is any one of the multiple clients participating in the session; and the transmitting module is configured to transmit the audio data and video data assigned to the first client to the first client, so as for the first client to present the received audio data and video data.

The assigning module includes:

a first determining unit, configured to determine at least one second client concerned by the first client according to a switching command transmitted by the first client when the session control commands comprise the switching command, the switching command comprises information of the at least one second client concerned currently by the first client, the at least one second client is at least one client in the multiple clients participating in the session other than the first client; and a first assigning unit, configured to assign received video data transmitted by the at least one second client to the first client.

The assigning module includes:

a second determination unit, configured to determine speaking clients among the multiple clients participating in the session according to session notification commands transmitted by the multiple clients participating in the session when the session control commands comprise the session notification commands, each of the session notification commands comprises information indicating whether a client participating in the session is currently speaking;

a selecting unit, configured to select clients of which the number is no more than a predetermined value from the speaking clients; and a second assigning unit, configured to assign received audio data transmitted by clients selected by the selecting unit to the first client.

The selection unit includes:

a determining subunit, configured to determine a concern weight for each of the speaking clients concerned by the first client when the number of the speaking clients is more than the predetermined value; and a selecting subunit, configured to select clients of which the number is no more than the predetermined value from the speaking clients based on concern weights of the speaking clients concerned by the first client.

The determining subunit is configured to calculate the concern weights based on the number of times that each of the speaking clients is concerned by the first client, a permission level of an operator to which each of the speaking clients belong, or/and a status hierarchy of each of the speaking clients.

A method for data presentation in a multiplayer session including:

establishing, by a first client, a session connection with a server, the first client is any one of multiple clients participating in the session;

transmitting a session control command, audio data and video data to the server through the session connection;

receiving audio data and video data assigned by the server based on the session control command, and presenting received audio data and video data.

Wherein, the session control command includes a switching command, the switching command comprises information of at least one second client concerned currently by the first client, the at least one second client is at least one client in the multiple clients participating in the session other than the first client;

the receiving video data assigned by the server based on the session control command includes:

receiving video data assigned, by the server, to the first client and transmitted by the at least one second client.

The session control command includes a session notification command;

the receiving audio data assigned by the server based on the session control command includes:

receiving audio data assigned, by the server, to the first client and transmitted by clients selected by the server;

wherein the clients selected by the server are determined by:

determining speaking clients among the multiple clients participating in the session based on session notification commands transmitted by the multiple clients participating in the session, and selecting clients of which the number is no more than a predetermined value from the speaking clients; the session notification command comprises information indicating whether the client participating in the session is currently speaking.

A client including:

a session connection establishing module, configured to establish a session connection with a server, the client is any one of multiple clients participating in the session;

a transmitting module, configured to transmit a session control command, audio data and video data to the server through the session connection;

a receiving module, configured to receive audio data and video data assigned by the server based on the session control command; and a presentation module, configured to present received audio data and video data.

The session control command includes a switching command, the switching command includes information of at least one second client concerned currently by the client, the at least one second client is at least one client in the multiple clients participating in the session other than the client;

the receiving module is configured to receive video data assigned, by the server, to the client and transmitted by the at least one second client.

The session control command comprises a session notification command;

the receiving module is configured to receive audio data assigned, by the server, to the client and transmitted by clients selected by the server;

wherein the clients selected by the server are determined by:

determining speaking clients among the multiple clients participating in the session for the server based on session notification commands transmitted by the multiple clients participating in the session, and selecting clients of which the number is no more than a predetermined value from the speaking clients; the session notification command comprises information indicating whether the client participating in the session is currently speaking.

A system for data presentation in a multiplayer session including a server and multiple clients participating in the multiplayer session; wherein the server is any of the servers described above;

any of the multiple clients participating in the session is any of the clients described above, configured to transmitting a session control command, local audio data and video data to the server through a session connection respectively, and presenting the audio data and video data assigned by the server.

A computer-readable storage medium storing one or more programs, which may be executed by one or more processors for performing a method for data presentation in a multiplayer session, the method, the method includes:

establishing a session connection with multiple clients participating in the session;

receiving session control commands, audio data and video data transmitted by the multiple clients participating in the session through the session connection;

assigning audio data and video data requested for presentation by a first client to the first client based on the session control commands transmitted by the multiple clients participating in the session, the first client is any one of the multiple clients participating in the session;

transmitting the audio data and video data assigned to the first client to the first client, so as for the first client to present the received audio data and video data.

Wherein the session control command includes a switching command, the assigning video data requested for presentation by a first client to the first client based on the session control commands transmitted by the multiple clients participating in the session includes:

determining at least one second client concerned by the first client based on the switching command transmitted by the first client, the switching command comprises information of at least one second client concerned currently by the first client, the at least one second client is at least one client in the multiple clients participating in the session other than the first client; and assigning received video data transmitted by the at least one second client to the first client.

Wherein the session control command includes session notification commands, the assigning audio data requested for presentation by a first client to the first client based on the session control commands transmitted by the multiple clients participating in the session includes:

determining speaking clients among the multiple clients participating in the session based on the session notification commands transmitted by the multiple clients participating in the session, each of the session notification commands comprises information indicating whether the client participating in the session is currently speaking;

selecting clients of which the number is no more than a predetermined value from the speaking clients, and assigning received audio data transmitted by selected clients to the first client.

Wherein the selecting clients of which the number is no more than the predetermined value from the speaking clients includes:

determining a concern weight for each of the speaking clients concerned by the first client when the number of the speaking clients is more than the predetermined value;

selecting clients of which the number is no more than the predetermined value from the speaking clients based on concern weights of the speaking clients concerned by the first client.

Wherein the determining the concern weight for each of the speaking clients concerned by the first client includes:

for each of the speaking clients, calculating a concern weight based on the number of times that the speaking client is concerned by the first client, a permission level of an operator to which the speaking client belongs, or/and a status hierarchy of the speaking client.

A computer-readable storage medium storing one or more programs, which may be executed by one or more processor for performing a method for data presentation in a multiplayer session, the method includes:

establishing a session connection between a first client and a server, the first client is any one of multiple clients participating in the session;

transmitting a session control command, audio data and video data to the server through the session connection;

receiving audio data and video data assigned by the server based on the session control command, and presenting received audio data and video data.

Wherein the session control command includes a switching command, the switching command includes information of at least one second client concerned currently by the first client, the at least one second client is at least one client in the multiple clients participating in the session other than the first client;

the receiving video data assigned by the server based on the session control command comprises:

receiving video data assigned by the server to the first client and transmitted by the at least one second client.

The session control command includes a session notification command;

the receiving audio data assigned by the server based on the session control command comprises:

receiving audio data assigned by the server to the first client and transmitted by clients selected by the server;

wherein the clients selected by the server are determined by:

determining speaking clients among the multiple clients participating in the session based on session notification commands transmitted by the multiple clients participating in the session, and selecting clients of which the number is no more than a predetermined value from the speaking clients; each of the session notification commands comprises information indicating whether the client participating in the session is currently speaking.

The advantages of the technical solutions provided by the embodiments of the present disclosure are as follows: audio data and video data are assigned to the first client in multiple clients participating in a session based on session control commands transmitted by the multiple clients participating in the session, the audio data and video data assigned to the first client are transmitted to the first client for presentation. Thus the audio data and video data assigned to the clients are controlled, which can reduce the dependence on network bandwidth, save network traffic, and reduce the performance requirements on the clients. For example, the users participating in a session are required to use multiple clients or a client having a large screen to present the audio and video data of the session in the prior art. When compared with it, technical solutions provided by the embodiments of the present disclosure reduce the performance requirements on the clients, due to the control of the audio data and video data assigned to the clients, so that a multiplayer session may cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

BRIEF DESCRIPTION OF DRAWINGS

In order to illustrate the technical solutions of the embodiments of the present disclosure more clearly, the drawings used in the description of the embodiments will be introduced below briefly. It is obvious that the drawings described below are only some embodiments of the present disclosure. For those skilled in the art, other drawings may be derived from these drawings without creative efforts.

DETAILED DESCRIPTION OF THE DISCLOSURE

In order to make objectives, technical solutions and advantages of the present disclosure clearer, the present disclosure will be described in detail hereinafter with reference to embodiments and accompanying drawings.

Embodiment 1

Figure 1:
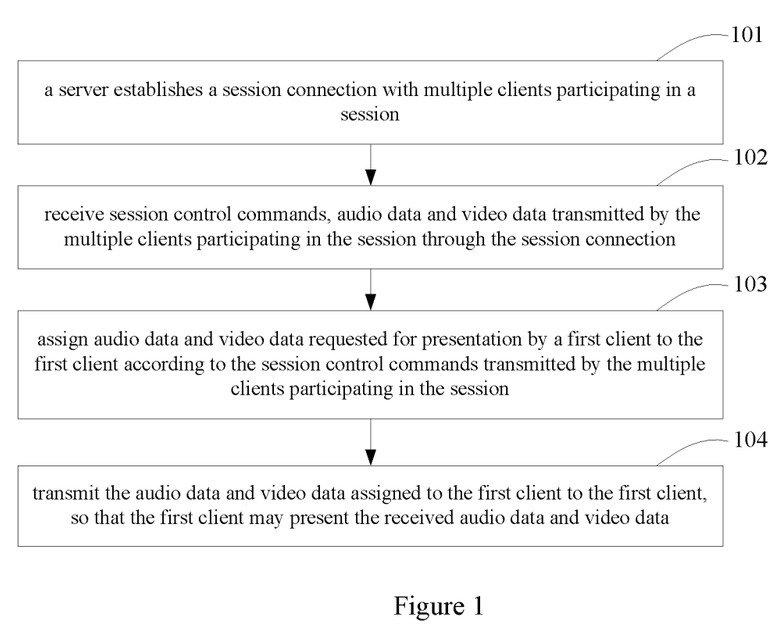
FIG. 1 is a flowchart illustrating a method for data presentation in a multiplayer session provided by an embodiment of the present disclosure.

Referring to FIG. 1, which is a flowchart illustrating a method for data presentation in a multiplayer session according to embodiment 1 of the present disclosure. The method may include the following processes.

Block 101: a server establishes a session connection with multiple clients participating in a session.

Block 102: the server receives session control commands, audio data and video data transmitted by the multiple clients participating in the session through the session connection.

Block 103: the server assigns audio data and video data requested for presentation by a first client to the first client according to the session control commands transmitted by the multiple clients participating in the session, wherein the first client is any one of the multiple clients participating in the session.

Block 104: the server transmits the audio data and video data assigned to the first client to the first client, so that the first client may present the received audio data and video data.

Figure 2:
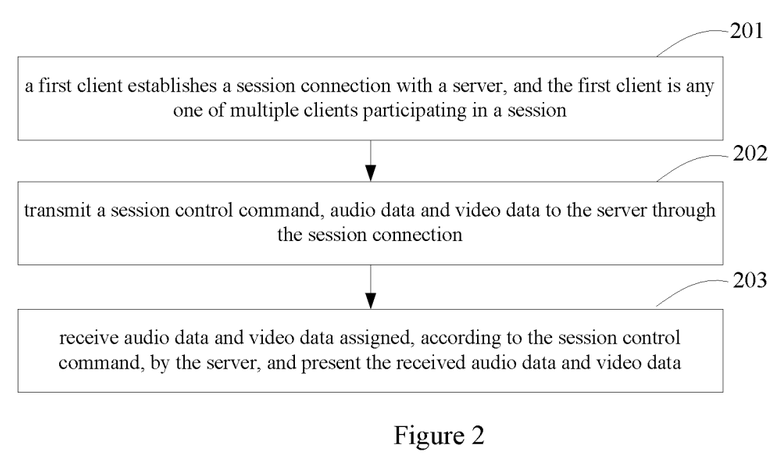
FIG. 2 is a flowchart illustrating another method for data presentation in a multiplayer session provided by an embodiment of the present disclosure.

Referring to FIG. 2, which is a flowchart illustrating another method for data presentation in a multiplayer session according to an embodiment of the present disclosure, the method may include the following processes.

Block 201: a first client establishes a session connection with a server, and the first client is any one of multiple clients participating in a session.

Block 202: the first client transmits a session control command, audio data and video data to the server through the session connection.

Block 203: the first client receives audio data and video data assigned, according to the session control command, by the server, and present the received audio data and video data.

The technical effects of the technical solutions provided by this embodiment of the present disclosure are as follows: audio data and video data are assigned to a first client, namely, any one of the multiple clients participating in a session based on session control commands transmitted by the multiple clients participating in the session, the audio data and video data assigned to the first client are transmitted to the first client for presentation, so that the audio data and video data assigned to the clients are controlled, which can reduce the dependence on network bandwidth, save network traffic, and reduce the performance requirements on the clients. For example, the users participating in a session are required to use multiple clients or a client having a large screen to present the audio and video data of the session in the prior art. Compared with it, the embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

Embodiment 2

Figure 3:
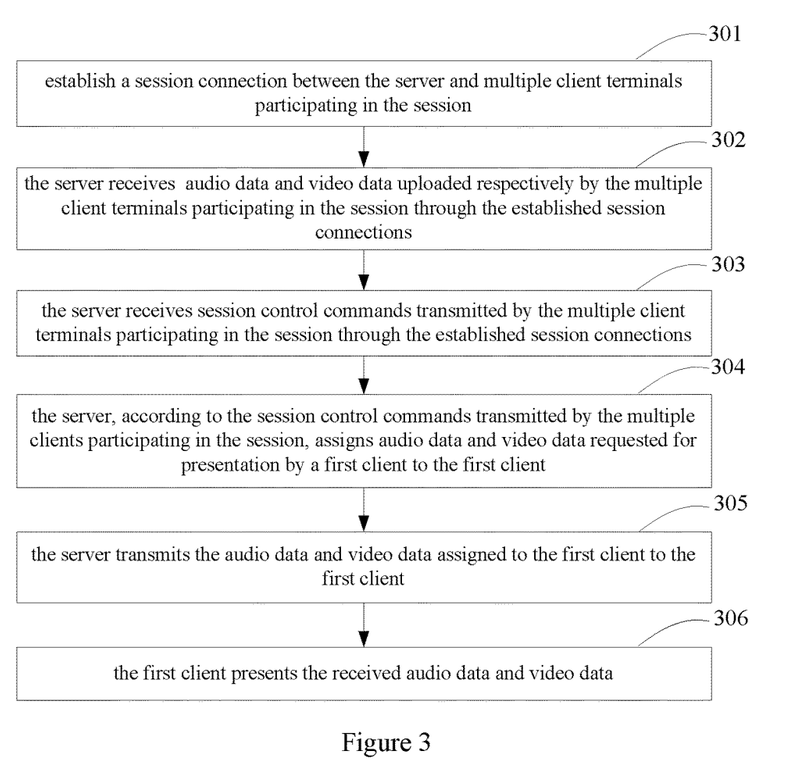
FIG. 3 is a flowchart illustrating a method for data presentation in a multiplayer session provided by an embodiment of the present disclosure.

Referring to FIG. 3, which is a flowchart illustrating a method for data presentation in a multiplayer session according to embodiment 2 of the present disclosure, the method may be applicable for a scenario in which a multiplayer video session is established through a wireless connection, which enables the clients participating in the session to present video data and audio data respectively in the multiplayer video session, for example, to present one-channel video data and multi-channel audio data. The video data described in all embodiments of the present disclosure refers to image data composed of a set of consecutive image frames. The multiplayer video session consists of a server and multiple clients participating in the session. The clients may be mobile communication devices, such as mobile phones or tablet PCs and the like. The server may be a streaming media server. The method may include the following processes.

Block 301: a session connection is established between a server and multiple clients participating in the session.

Specifically, the server may establish the session connection with the multiple clients participating in the session through a wireless connection, a wired connection or combination of a wireless connection and a wired connection, this embodiment is not particularly limited hereto. Wherein the process for establishing a session connection described in this embodiment of the present disclosure may include the following.

A first client transmits a call request to the server, to call other clients participating in the session through the server. The first client is any one of the multiple clients participating in the session. The call request may include information of the called clients participating in the session, for example, an identifier and other information of the called clients participating in the session.

As an alternative implementable embodiment, when receiving the call request transmitted by the first client, the server may assign a session room, and notify the first client to enter the session room to wait; subsequently, the server may forward the call request to the clients participating in the session called by the first client, and after receiving a call response returned by the clients participating in the session called by the first client, notify the clients participating in the session called by the first client to enter the session room to wait. In this way, a session connection is established between the server and the multiple clients participating in the session.

As another alternative implementable embodiment, when receiving the call request transmitted by the first client, the server may forward the call request to the clients participating in the session called by the first client, after a call response returned by the clients participating in the session called by the first client is received, the server may assign a session room and notify the first client and the client participating in the session called by the first client to enter the session room to wait. In this way, a session connection is established between the server and the multiple clients participating in the session.

Figure 4:
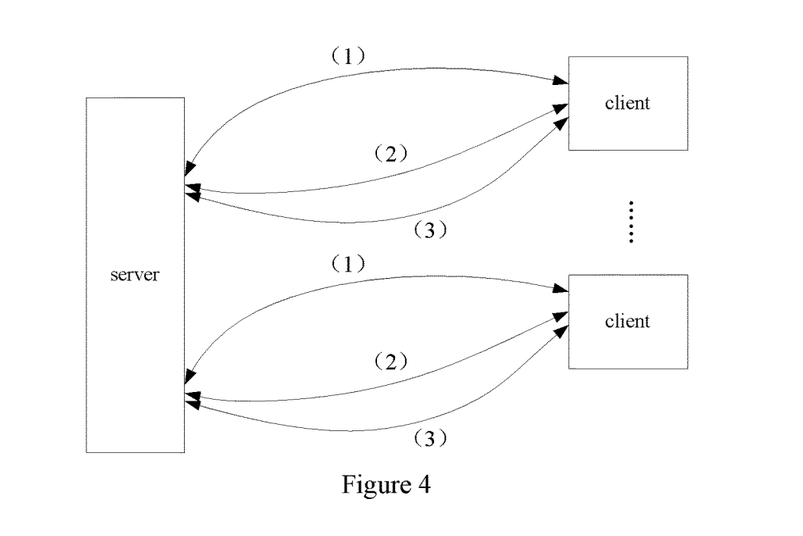
FIG. 4 is a schematic diagram illustrating a session connection established between a server and clients participating in the session, provided by an embodiment of the present disclosure.

FIG. 4 is a schematic diagram illustrating a session connection established between a server and clients participating in a session provided by an embodiment of the present disclosure. The server may establish a session connection with the clients participating in the session at an application layer in the manner described above. The session connection may include: a session control connection (1), a video data transmission connection (2) and an audio data transmission connection (3), etc.

In this embodiment of the present disclosure, above mentioned connections established by the server may reuse either the same TCP (Transmission Control Protocol) connections or UDP (User Datagram Protocol) connections, or respectively use different TCP or UDP connections.

After the session connection is established between the server and the multiple clients participating in the session, the clients in the same session room can speak with each other through the session connection established with the server.

Block 302: the server receives audio data and video data uploaded respectively by each of the multiple clients participating in the session through the established session connection.

In this embodiment of the present disclosure, when the multiple clients participating in the session engage in the session, each of them respectively collects local audio data and video data, and respectively uploads collected audio data and video data to the server through the established audio data transmission connection and video data transmission connection.

In this way, after receiving the audio data and video data uploaded respectively by each of the multiple clients participating in the session, the server may select audio data and video data to be assigned to and to be presented by the clients participating in the session from the received audio data and video data. With regard to the specific assignment procedure, see the descriptions of blocks 303 and 304.

Block 303: the server receives session control commands transmitted by the multiple clients participating in the session through the established session connection, wherein the session control commands may include session notification commands and switching commands or other commands.

In this embodiment of the present disclosure, when a client participating in the session initiates or terminates the session, the client participating in the session may transmit a session notification command to the server through the established session control connection to notify the server of session state of the client participating in the session. The session notification command may include information indicating whether the client participating in the session speaks in the session. When a client participating in the session switches to other clients participating in the session concerned by it, the client may transmit a switching command to the server through the established session control connection to notify the server of the information of the clients concerned by the client participating in the session. The switching command may include information of the switched clients.

In this embodiment of the present disclosure, the server may, according to the switching command transmitted by each client participating in the session, determine clients among the multiple clients participating in the session which are not concerned by other clients. As an alternative implementable embodiment, the server may discard the received audio data and video data uploaded by the clients which are not concerned by other clients. As another alternative implementable embodiment, the server may transmit an upload terminating command to the clients which are not concerned by other clients, when receiving the upload terminating command, the clients which are not concerned by other clients will terminate the uploading of the locally collected audio data and video data, for the purpose of saving wireless bandwidth.

In this embodiment of the present disclosure, block 302 and block 303 are not limited to above execution order. Namely, block 302 and block 303 may be executed at the same time, or block 303 may be executed before block 302.

Block 304: the server, according to the session control commands transmitted by the multiple clients participating in the session, assigns audio data and video data requested for presentation by a first client to the first client. The first client is any one of the multiple clients participating in the session.

In this embodiment of the present disclosure, the process for assigning video data to the first client may include the following.

A second client concerned by the first client is determined according to a switching command transmitted by the first client. The switching command includes the information of the second client currently concerned by the first client. The second client includes one or more clients in the multiple clients participating in the session other than the first client.

The received video data transmitted by the second client is assigned to the first client.

In this embodiment of the present disclosure, by transmitting the video data of the second client concerned by the first client to the first client, the first client can display the concerned client in a switching manner by switching constantly the concerned second client. Thus the user experience may be ensured. For example, when the first client is a small screen client, the first client may only concern one client participating in a session at a time, in this way, the first client may present the video data of one client participating in the session at a time, so that the first client having a small screen may present a larger video image, and the free switching of the concerned client participating in the session may ensure that the first client having a small screen can freely switch and present the clients participating in the session, and finally the user experience is ensured.

In this embodiment of the present disclosure, the process for assigning audio data to the first client may include the following.

Speaking clients in the multiple clients participating in the session are determined according to the session notification commands transmitted by the multiple clients participating in the session. The session notification command may include the information indicating whether a client participating in the session is speaking currently.

Clients, of which the number is no more than a predetermined value, are selected from the speaking clients, and the received audio data transmitted by the selected client is assigned to the first client. The predetermined value may be preset based on the bandwidth of the network.

In this embodiment of the present disclosure, when the number of the speaking clients is no more than the predetermined value, the received audio data transmitted by the speaking clients is assigned to the first client.

When the number of the speaking clients is more than the predetermined value, a concern weight is determined for each of the speaking clients concerned by the first client.

Clients, of which the number is no more than a predetermined value, are selected from the speaking clients based on the concern weight of the speaking clients concerned by the first client. In this embodiment of the present disclosure, when the clients are selected from the speaking clients based on the concern weight, a speaking client with a high concern weight is preferably selected.

The method for determining a concern weight for each of the speaking clients concerned by the first client may include the following. The concern weights of the speaking clients concerned by the first client may be calculated (e.g., weighted calculation or the like) based on the number of times that each of the speaking clients is concerned by the first client, a permission level of the operator to which each of the speaking clients belongs, or/and a status hierarchy of each speaking client.

In this embodiment of the present disclosure, by selecting the clients of which the number is no more than a predetermined value from the speaking clients, and assigning the audio data transmitted by the selected clients to the first client, the amount of the audio data presentable by the first client is defined, thereby reducing the requirement on the network bandwidth in a multiplayer session.

Although the amount of the audio data presentable by the first client is defined in this embodiment of the present disclosure, the user experience would not be reduced, for which the reason is as follows. In a multiplayer session, if two or three people speak at the same time, the listener may distinguish who is saying, and what is said. However, when too many people (such as a dozen people) speak at the same time, the listener cannot basically tell who is saying, and what is said. While in a friendly conversation, such a situation in which too many people speak at the same time will soon disappear, everyone will be quiet for politeness to let one person or a handful of people speak. Thus, in this embodiment of the present disclosure, the definition of the amount of the audio data presented by the first client to the amount of the audio data transmitted by other clients participating in the session of which the number is no more than the predetermined value would not reduce the user experience.

In this embodiment of the present disclosure, when the number of the speaking clients in the multiple clients participating in the session is more than the predetermined value, if the concern weights of the speakers concerned by the first client is to be adopted, it must be ensured that the first client may present the audio data of the concerned important clients participating in the session, which will ensure the user experience in some degree.

When this embodiment of the present disclosure is specifically implemented, the server assigns the audio data to the first client may include the following.

1) The server maintains a video concern list for the first client based on the received switching commands transmitted by the first client. The video concern list stores a corresponding relationship between the second clients concerned by the first client and the concern weights.

Specifically, the information of the second clients concerned by the first client is added up and recorded based on the switching commands transmitted by the first client. The information of the second clients concerned by the first client includes an identifier of a second client and the number of times that the second client is concerned by the first client. For example, the first client concerned Client 2, Client 3 and Client 4 successively, the number of times that Client 2, Client 3 and Client 4 is concerned by the first client is 3, 1 and 4 respectively, based on the recorded information of the second clients concerned by the first client, concern weights of the second clients concerned by the first client may be calculated. As an alternative embodiment, the number of times that a second client is concerned by the first client may be directly used as the concern weight of the second client. As another alternative implementable embodiment, the concern weight of the second client may be calculated (e.g., weighted calculation or the like) based on the number of times that the second client is concerned by the first client, a status hierarchy of the second client or/and a level of the operator to which the second client belongs.

The status hierarchy of a second client and the level of the operator to which the second client belongs may both be found in the locally stored files of the server. This is due to the fact that when a session connection is established between the server and the second client, the second client is required to register with the server for informing the server of the basic user information, such as the status of the second client and the operator to which the second client belongs and the like. The server may inquire the corresponding relationship between the status and the status hierarchy according to the identity of the second client to obtain the status hierarchy of the second client, and may search a corresponding relationship between the operator and the operator level according to the operator to which the second client belongs to obtain the level of the operator to which the second client belongs. Then, the server may store the information, such as the corresponding status hierarchy of the second client and the level of the operator to which the second client belongs or the like, in the locally stored files. Thus, the server may obtain the status hierarchy of the second client and the level of the operator to which the second client belongs and other information from the locally stored files.

For example, a video concern list of the first client obtained by the server is shown in Table 1.

TABLE 1

| a video concern list of the first client | |
|---|---|
| The concerned second client | Concern weight |
| Client 2 | 3 |
| Client 3 | 1 |
| Client 4 | 4 |
| . . . | . . . |

2) A current speaker list is maintained based on session notification commands transmitted by the clients participating in the session, the current speaker list provides information of current speaking clients in a multiplayer session, as specifically shown in Table 2.

TABLE 2 a current speaker list

| Clients participating in the session | Whether speak in the session |
|---|---|
| Client 1 | Yes |
| Client 2 | Yes |
| Client 3 | No |
| Client 4 | Yes |
| ... | ... |

3) The amount of audio data that may be assigned to the first client is determined based on the bandwidth of a wireless network.

In this embodiment of the present disclosure, the amount of audio data refers to the amount of audio data that may be presented by the first client, for example, Client 1 may present one-channel audio data, that is, the client 1 may present audio data corresponding to one of other clients participating in the session.

4) The audio data to be assigned to the first client is determined based on the maintained video concern list of the first client and a current speaker list.

In particular, the current speaking clients may be obtained by searching the current speaker list, as shown in Table 2, the current speaking clients include Client 1, Client 2 and Client 4.

Since Client 1 is the current speaking client, it is not necessary to assign the audio data corresponding to Client 1 to Client 1. Because Client 1 may present one-channel audio data, one client may be selected from the current speaking Client 2 and Client 4 and audio data corresponding to the selected client may be assigned to Client 1.

As can be seen from the video concern list of Client 1 shown in Table 1, the current speaking Client 2 has a concern weight of 3, and the current speaking Client 4 has a concern weight of 4, hence the audio data transmitted by Client 4 may be assigned to Client 1.

Block 305: the server transmits the audio data and video data assigned to the first client to the first client. Specifically, the audio data and video data assigned to the first client may be transmitted to the first client respectively through the audio data transmission connection and video data transmission connection established between the server and the first client.

Specifically, the server may encode the audio data and video data assigned to the first client. For example, the server may use AMR (Adaptive Multi-Rate) encoding to encode the audio data assigned to the first client, and then transmits the encoded audio data to the first client, so as to save transmission bandwidth of audio data and improve transmission efficiency and transmission security of the audio data. An encryption technique may be adopted to encrypt the video data, and then the encrypted video data assigned to the first client is transmitted to the first client through the video data transmission connection.

Block 306: the first client presents the received audio data and video data.

Figure 5:
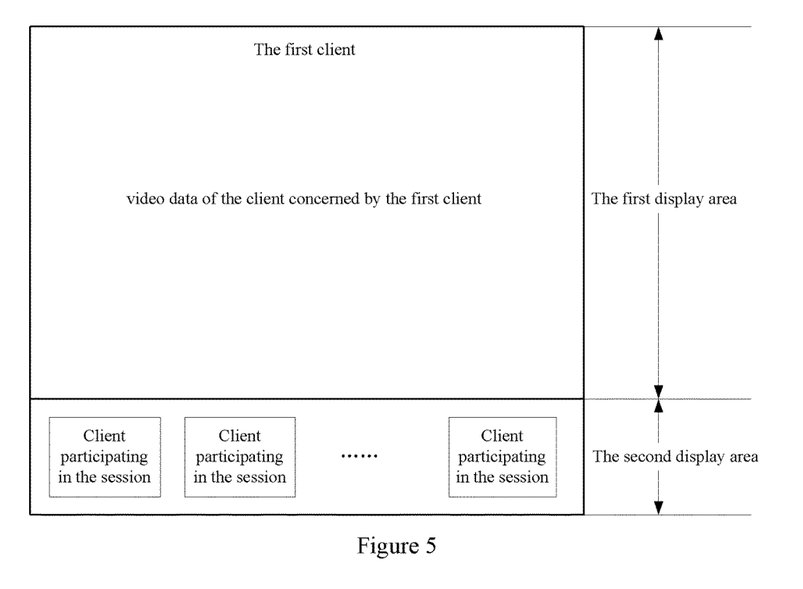
FIG. 5 is a schematic diagram illustrating data presentation by a first client in a multiplayer session provided by an embodiment of the present disclosure.

On one hand, the first client decrypts the received video data and displays the decrypted video data. Referring to FIG. 5, in this embodiment of the present disclosure, the first client may display the received video data, namely the video data of the client (the second client) concerned by the first client, in a first display area, avatar icons of other clients participating in the session except the first client and the second client are displayed in a second display area, so that the first client may select and switch its concerned clients based on the avatar icons displayed in the second display area.

On the other hand, the first client mixes and plays the received audio data. To be specific, the first client may be preinstalled with a mixer, and the mixer may mix and synthesize received multiple-channel audio data into one-channel audio signal for playing. The specific mixing method may refer to the prior art, no further description will be given here.

The beneficial effects of the technical solutions provided by this embodiment of the present disclosure are as follows: audio data and video data are assigned to a first client, namely, any one of the multiple clients participating in a session based on session control commands transmitted by the multiple clients participating in the session, the audio data and video data assigned to the first client are transmitted to the first client for presentation, so that the audio data and video data assigned to the clients are controlled, which can reduce the dependence on network bandwidth, save network traffic, and reduce the performance requirements on the clients. For example, the users participating in a session are required to use multiple clients or a client having a large screen to present the audio and video data of the session in the prior art. Compared with it, this embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

Embodiment 3

Figure 6:
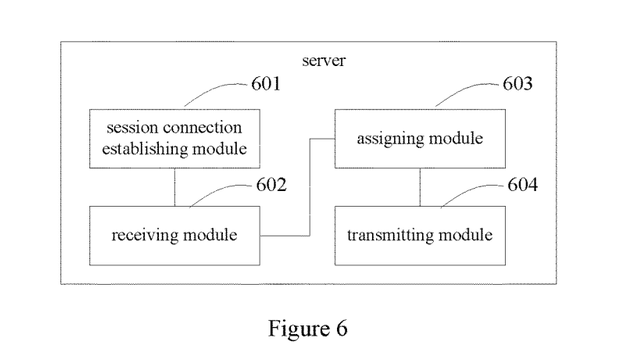
FIG. 6 is a schematic diagram illustrating a server provided by an embodiment of the present disclosure.

Referring to FIG. 6, this embodiment of the present disclosure provides a server. The server may be the same as the server described in above mentioned method embodiments. The server may include a session connection establishing module 601, a receiving module 602, an assigning module 603 and a transmitting module 604.

The session connection establishing module 601 is configured to establish a session connection with multiple clients participating in a session.

The receiving module 602 is configured to receive session control commands, audio data and video data transmitted by the multiple clients participating in the session through the session connection.

The assigning module 603 is configured to assign audio data and video data requested for presentation by a first client to the first client according to the session control commands transmitted by the multiple clients participating in the session, the first client is any one of the multiple clients participating in the session.

The transmitting module 604 is configured to transmit the audio data and video data assigned to the first client to the first client, so that the first client may present the received audio data and video data.

Figure 7:
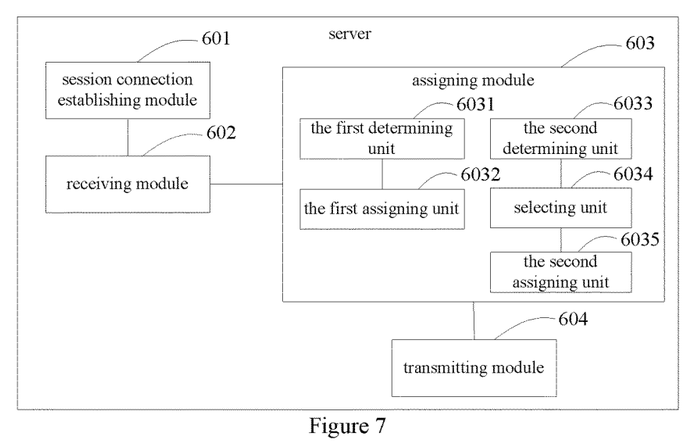
FIG. 7 is a schematic diagram illustrating a server provided by an embodiment of the present disclosure.

Referring to FIG. 7, the assigning module 603 shown in FIG. 6 according to this embodiment of the present disclosure may include the following.

A first determining unit 6031, configured to determine a second client concerned by the first client according to a switching command transmitted by the first client when the session control commands include the switching command. The switching command includes information of the second client concerned currently by the first client, the second client is one or more clients in the multiple clients participating in the session other than the first client.

A first assigning unit 6032, configured to assign received video data transmitted by the second client to the first client.

A second determining unit 6033, configured to, when the session control commands include session notification commands, determine speaking clients among the multiple clients participating in the session according to the session notification commands transmitted by the multiple clients participating in the session. Each of the session notification commands includes information indicating whether a client participating in the session is currently speaking.

A selecting unit 6034, configured to select clients of which the number is no more than a predetermined value from the speaking clients.

A second assigning unit 6035, configured to assign received audio data transmitted by the selected clients to the first client.

To be specific, the selection unit 6034 may include the following.

A determining subunit, configured to determine a concern weight for each of the speaking clients concerned by the first client when the number of the speaking clients is more than the predetermined value.

A selecting subunit, configured to select clients of which the number is no more than the predetermined value from the speaking clients based on the concern weights of the speaking clients concerned by the first client.

The determining subunit is specifically configured to, for each of the speaking clients, calculate the concern weight based on the number of times that the speaking client is concerned by the first client, a permission level of the operator to which the speaking client belongs, or/and a status hierarchy of the speaking client.

The beneficial effects of the technical solutions provided by this embodiment of the present disclosure are as follows: audio data and video data are assigned to a first client, namely, any one of the multiple clients participating in a session based on a session control command transmitted by the multiple clients participating in the session, the audio data and video data assigned to the first client are transmitted to the first client for presentation, so that the audio data and video data assigned to the clients are controlled, which can reduce the dependence on network bandwidth, save network traffic, and reduce the performance requirements on the clients, for example, the users participating in a session are required to use multiple clients or a client having a large screen to present the audio and video data of the session in the prior art. Compared with it, this embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

Embodiment 4

Figure 8:
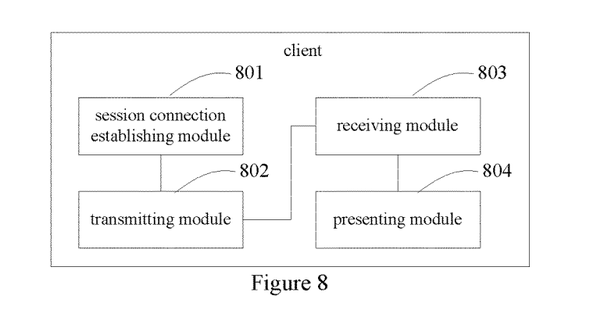
FIG. 8 is a schematic diagram illustrating a client provided by an embodiment of the present disclosure.

Referring to FIG. 8, this embodiment of the present disclosure provides a client. The client may be the same as the client described in above mentioned method embodiment. The client may include a session connection establishing module 801, a transmitting module 802, a receiving module 803 and a presenting module 804.

The session connection establishing module 801 is configured to establish a session connection with a server. The client is any one of multiple clients participating in the session.

The transmitting module 802 is configured to transmit a session control command, audio data and video data to the server through the session connection.

The receiving module 803 is configured to receive audio data and video data assigned, based on the session control command, by the server.

The presenting module 804 is configured to present the received audio data and video data.

As an alternative embodiment, the session control command includes a switching command, and the switching command includes information of a second client concerned currently by the client. The second client is one or more clients in the multiple clients participating in the session other than the client.

The receiving module 803 is configured to receive the video data assigned to the client by the server and transmitted by the second client.

As another alternative embodiment, the session control command includes a session notification command.

The receiving module 803 is configured to receive the audio data assigned by the server to the client and transmitted by clients selected by the server.

The clients selected by the server are determined according to the following process. The server determines speaking clients among the multiple clients participating in the session according to session notification commands transmitted by the multiple clients participating in the session, and select clients of which the number is no more than a predetermined value from the speaking clients. A session notification command includes information indicating whether a client participating in the session is currently speaking.

The beneficial effects of the technical solutions provided by this embodiment of the present disclosure are as follows: by transmitting a session control command to the server and receiving audio data and video data assigned by the server for presentation, the presented audio data and video data is controlled, which can reduce the dependence on network bandwidth, save network traffic, and reduce the performance requirements on the clients. For example, the users participating in a session are required to use multiple clients or a client having a large screen to present the audio and video data of the session in the prior art. Compared with it, this embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

Embodiment 5

Figure 9:
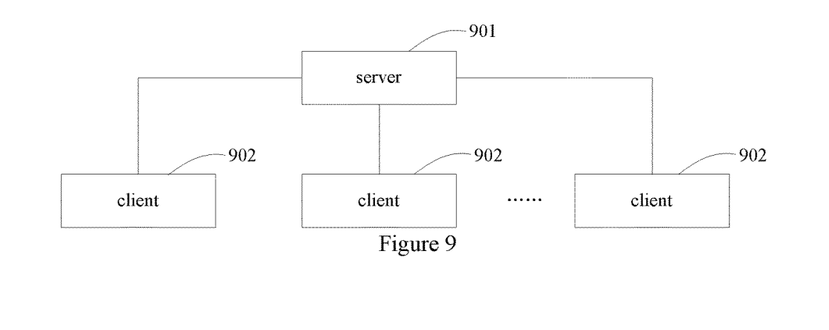
FIG. 9 is a schematic diagram illustrating a system for data presentation in a multiplayer session provided by an embodiment of the present disclosure.

Referring to FIG. 9, this embodiment of the present disclosure further provides a system for data presentation in a multiplayer session. The system includes a server 901 and multiple clients 902 participating in the multiplayer session.

The server 901 may refer to any one of the servers described in Embodiment 3, therefore no further descriptions will be provided here.

Any one of the multiple clients 902 participating in the session may be any one of the clients described in Embodiment 4, configured to transmit a session control command, local audio data and video data to the server 401 through a session connection respectively, and present audio data and video data assigned by the server 401.

The beneficial effects of the technical solutions provided by this embodiment of the present disclosure are as follows: audio data and video data are assigned to a first client, namely, any one of the multiple clients participating in a session based on a session control command transmitted by the multiple clients participating in the session, the audio data and video data assigned to the first client are transmitted to the first client for presentation, so that the audio data and video data assigned to the clients are controlled, which can reduce the dependence on network bandwidth, save network traffic, and reduce the performance requirements on the clients, for example, the users participating in a session are required to use multiple clients or a client having a large screen to present the audio and video data of the session in the prior art. Compared with it, this embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

The above embodiments may be implemented by hardware, software, firmware, or a combination thereof. For example the various methods, processes and functional modules (including units and subunits) described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules if mentioned in the aforesaid embodiments, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure. The non-transitory storage medium includes a hard disk, a floppy disk, a magnetic disk, a compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

For example, the server mentioned in above embodiments may include a memory and a processor in communication with the memory. The memory may store a group of instructions which may be executed by the processor to implement the operations of modules, units and subunits of any one of the servers mentioned above.

The client mentioned in above embodiments may include a memory and a processor in communication with the memory. The memory may store a group of instructions which may be executed by the processor to implement the operations of modules of any one of the clients mentioned above. The client may be a user terminal.

Embodiment 6

This embodiment of the present disclosure provides a computer-readable storage medium, which can be a computer-readable storage medium contained in the server described in the embodiment mentioned above, or a computer-readable storage medium standing alone and unassembled into a server. The computer-readable storage medium may store one or more programs. The one or more programs may be executed by one or more processors for performing a method for data presentation in a multiplayer session. The method may include the following.

Establishing a session connection with multiple clients participating in a session.

Receiving session control commands, audio data and video data transmitted by the multiple clients participating in the session through the session connection.

Assigning audio data and video data requested for presentation by a first client to the first client according to the session control commands transmitted by the multiple clients participating in the session. The first client is any one of the multiple clients participating in the session.

Transmitting the audio data and video data assigned to the first client to the first client, so that the first client may present the received audio data and video data.

It is assumed that the implementation described above is a first possible implementation, in a second possible implementation provided based on the first possible implementation, the session control commands includes a switching command. The method for assigning video data to be presented by the first client to the first client according to the session control commands transmitted by the multiple clients participating in the session may include the following.

Determining a second client concerned by the first client according to the switching command transmitted by the first client. The switching command includes information of the second client concerned currently by the first client. The second client is one or more clients in the multiple clients participating in the session other than the first client.

Assigning received video data transmitted by the second client to the first client.

In a third possible implementation provided based on the first possible implementation, the session control commands include session notification commands. The method for assigning audio data to be presented by the first client to the first client according to the session control commands transmitted by the multiple clients participating in the session may include the following.

Determining speaking clients in the multiple clients participating in the session according to the session notification commands transmitted by the multiple clients participating in the session. Each of the session notification commands includes information indicating whether a client participating in the session is currently speaking.

Selecting clients of which the number is no more than a predetermined value from the speaking clients, and assigning received audio data transmitted by the selected clients to the first client.

In a fourth possible implementation provided based on the third possible implementation, the method for selecting clients of which the number is no more than a predetermined value from the speaking clients may include the following.

Determining a concern weight for each of the speaking clients concerned by the first client when the number of the speaking clients is more than the predetermined value.

Selecting clients of which the number is no more than the predetermined value from the speaking clients based on the concern weights of the speaking clients concerned by the first client.

In a fifth possible implementation provided based on the fourth possible implementation, the method for determining the concern weights for the speaking clients concerned by the first client may include the following.

Calculating the concern weights based on the number of times that each of the speaking clients is concerned by the first client, a permission level of an operator to which each of the speaking clients belongs, or/and a status hierarchy of each of the speaking clients.

Audio data and video data are assigned to a first client, namely, any one of the multiple clients participating in a session based on session control commands transmitted by the multiple clients participating in the session, the audio data and video data assigned to the first client are transmitted to the first client for presentation, so that the audio data and video data assigned to the clients are controlled, which can reduce the dependence on network bandwidth, save network traffic, and reduce the performance requirements on the clients. For example, the users participating in a session are required to use multiple clients or a client having a large screen to present the audio and video data of the session in the prior art. Compared with it, this embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

Embodiment 7

This embodiment of the present disclosure provides a computer-readable storage medium, which can be a computer-readable storage medium contained in the client described in the embodiment described above, or a computer-readable storage medium standing alone and unassembled into a terminal. The computer-readable storage medium may store one or more programs, which may be executed by one or more processors for performing a method for data presentation in a multiplayer session. The method may include the following.

Establishing a session connection with a server. A first client is any one of multiple clients participating in the session.

Transmitting a session control command, audio data and video data to the server through the session connection.

Receiving audio data and video data assigned by the server based on the session control command, and presenting the received audio data and video data.

It is assumed that the implementation described above is a first possible implementation, in a second possible implementation provided based on the first possible implementation, the session control command includes a switching command including information of the second client concerned currently by the first client. The second client is one or more clients in the multiple clients participating in the session other than the first client.

The receiving video data assigned by the server based on the session control command may include the following.

Receiving video data assigned to the first client by the server and transmitted by the second client.

In a third possible implementation provided based on the first possible implementation, the memory of a terminal further comprises instructions for executing the following operations.

The session control command includes a session notification command; and the receiving audio data assigned by the server based on the session control command may include the following.

Receiving audio data assigned, by the server, to the first client and transmitted by clients selected by the server.

The clients selected by the server may be determined according to the following process. The server determines speaking clients among the multiple clients participating in the session according to session notification commands transmitted by the multiple clients participating in the session, and select clients the number of which is no more than a predetermined value from the speaking clients. The session notification command includes information indicating whether the client participating in the session is currently speaking.

In the computer-readable storage medium provided by this embodiment of the present disclosure, by transmitting a session control command to the server and receiving audio data and video data assigned by the server for presentation, the presented audio data and video data are controlled, which can reduce the dependence on network bandwidth, save network traffic, and reduce the performance requirements on the clients. For example, the users participating in a session are required to use multiple clients or a client having a large screen to present the audio and video data of the session in the prior art. Compared with it, this embodiment of the present disclosure reduces the performance requirements on the clients, due to the control of the audio data and video data assigned to the clients, so that a multiplayer session can cover more users (which may include a small screen client, such as mobile phone or the like, or a large screen client, such as computer or the like). On the other hand, the server is only responsible for assigning and forwarding the video and audio resources, the consumption of resources is reduced and resource allocation concurrency is improved, which supports a large number of session users at low cost.

It should be noted that data presentation implemented by the server and the clients provided by the embodiment described above is illustrated only by way of embodiments in terms of the division of the functional modules described above. In practical applications, the functions described above may be distributed to and performed by different functional modules as needed, that is to say, the internal structures of the server and the clients may be divided into different functional modules, to perform all or some of the functions described above. In addition, the embodiments of the server, the clients and the system and method for data presentation in a multiplayer video session provided by the embodiments described above are covered by the same inventive concept, for the specific implementation procedures, reference is made to the embodiments of the method, and therefore, are not discussed further herein.

The embodiments of the present disclosure described above are presented for purposes of description, and do not mean the merits of the embodiments.

It is apparent to those skilled in the art that all of or some of the blocks of the embodiments described above may be implemented by hardware or by related hardware instructed by programs. The programs can be stored in a computer-readable storage medium, which may be a read-only memory, a magnetic disk or an optical disk and the like.

The foregoing description is only preferred embodiments of the present disclosure and is not configured to limiting the protection scope thereof. Any modification, equivalent substitution, or improvement made without departing from the spirit and principle of the present disclosure should be covered by the protection scope of the present disclosure.

The invention claimed is:

1. A method for data presentation in a multiplayer session, comprising:
    establishing, by a server, a session connection with multiple clients participating in the session;
    receiving, by the server, session control commands, audio data and video data transmitted by the multiple clients participating in the session through the session connection;
    assigning, by the server, audio data and video data requested for presentation by a first client to the first client according to the session control commands transmitted by the multiple clients participating in the session, the first client is any one of the multiple clients participating in the session;
    transmitting, by the server, the audio data and video data assigned to the first client to the first client, so as for the first client to present the audio data and video data; and
    determining, by the server, clients among the multiple clients participating in the session which are not concerned by other clients, discarding the received audio data and video data uploaded by the clients which are not concerned by the other clients, or transmitting an upload terminating command to the clients which are not concerned by the other clients to enable the clients which are not concerned by the other clients terminate the uploading of the audio data and video data.

2. The method according to claim 1, wherein the session control commands includes a switching command, the assigning video data requested for presentation by the first client to the first client according to the session control commands transmitted by the multiple clients participating in the session comprises:
    determining at least one second client concerned by the first client according to the switching command transmitted by the first client, the switching command comprises information of the at least one second client concerned currently by the first client, the at least one second client is at least one client in the multiple clients participating in the session other than the first client; and
    assigning received video data transmitted by the at least one second client to the first client.

3. The method according to claim 1, wherein the session control commands comprises session notification commands, the assigning audio data requested for presentation by the first client to the first client according to the session control commands transmitted by the multiple clients participating in the session comprises:
    determining speaking clients in the multiple clients participating in the session according to the session notification commands transmitted by the multiple clients participating in the session, the session notification commands comprises information indicating whether the clients participating in the session are currently speaking; and
    selecting clients from the speaking clients, wherein a number of the selected client is no more than a predetermined value; and assigning received audio data transmitted by selected clients to the first client.

4. The method according to claim 3, wherein the selecting clients from the speaking clients, wherein the number of selected client is no more than a predetermined value; comprises:
    determining a concern weight for each of the speaking clients concerned by the first client when the number of the speaking clients is more than the predetermined value; and
    selecting clients from the speaking clients according to concern weights of the speaking clients concerned by the first client; wherein the number of selected client is no more than a predetermined value.

5. The method according to claim 4, wherein the determining a concern weight for each of the speaking clients concerned by the first client comprises:
    for each of the speaking clients, calculating a concern weight based on the number of times that the speaking client is concerned by the first client, a permission level of an operator to which the speaking client belongs, or/and a status hierarchy of the speaking client.

6. A server, comprising: a processor and a memory: wherein the processor and the memory are connected with each other via an internal bus: the memory stores a set of instructions for performing a method for data presentation in a multiplayer session, the set of instructions to direct the processor to perform acts of:
    establishing a session connection with multiple clients participating in a session;
    receiving session control commands, audio data and video data transmitted by the multiple clients participating in the session through the session connection;
    assigning audio data and video data requested for presentation by a first client to the first client according to the session control commands transmitted by the multiple clients participating in the session, the first client is any one of the multiple clients participating in the session;
    transmitting the audio data and video data assigned to the first client to the first client, so as for the first client to present the received audio data and video data; and
    determining, by the server, clients among the multiple clients participating in the session which are not concerned by other clients, discarding the received audio data and video data uploaded by the clients which are not concerned by the other clients, or transmitting an upload terminating command to the clients which are not concerned by other clients to enable the clients which are not concerned by other clients terminate the uploading of the audio data and video data.

7. The server according to claim 6, wherein assigning audio data and video data requested for presentation by a first client to the first client according to the session control commands transmitted by the multiple clients participating in the session comprises:

determining at least one second client concerned by the first client according to a switching command transmitted by the first client when the session control commands comprise the switching command, the switching command comprises information of the at least one second client concerned currently by the first client, the at least one second client is at least one client in the multiple clients participating in the session other than the first client; and assigning received video data transmitted by the at least one second client to the first client.

8. The server according to claim 6, wherein assigning audio data and video data requested for presentation by a first client to the first client according to the session control commands transmitted by the multiple clients participating in the session comprises:

determining speaking clients among the multiple clients participating in the session according to session notification commands transmitted by the multiple clients participating in the session when the session control commands comprise the session notification commands, each of the session notification commands comprises information indicating whether a client participating in the session is currently speaking;

selecting clients from the speaking clients; wherein a number of the selected client is no more than a predetermined value; and assigning received audio data transmitted by the selected clients to the first client.

9. The server according to claim 8, wherein selecting clients from the speaking clients comprises:

determining a concern weight for each of the speaking clients concerned by the first client when the number of the speaking clients is more than the predetermined value; and selecting clients from the speaking clients based on concern weights of the speaking clients concerned by the first client.

10. The server according to claim 9, wherein the concern weights is calculated based on the number of times that each of the speaking clients is concerned by the first client, a permission level of an operator to which each of the speaking clients belong, or/and a status hierarchy of each of the speaking clients.

11. A method for data presentation in a multiplayer session, comprising:

establishing, by a first client, a session connection with a server, the first client is any one of multiple clients participating in the session;

transmitting a session control command, audio data and video data to the server through the session connection;

receiving audio data and video data assigned by the server based on the session control command, and presenting received audio data and video data; and determining, by the server, clients among the multiple clients participating in the session which are not concerned by other clients, discarding the received audio data and video data uploaded by the clients which are not concerned by other clients, or transmitting an upload terminating command to the clients which are not concerned by other clients to enable the clients which are not concerned by other clients terminate the uploading of the audio data and video data.

12. The method according to claim 11, wherein the session control command includes a switching command, the switching command comprises information of at least one second client concerned currently by the first client, the at least one second client is at least one client in the multiple clients participating in the session other than the first client;

the receiving video data assigned by the server based on the session control command comprises:

receiving video data assigned, by the server, to the first client and transmitted by the at least one second client.

13. The method according to claim 11, wherein the session control command includes a session notification command;

the receiving audio data assigned by the server based on the session control command comprises:

receiving audio data assigned, by the server, to the first client and transmitted by clients selected by the server;

wherein the clients selected by the server are determined by:

determining speaking clients among the multiple clients participating in the session based on session notification commands transmitted by the multiple clients participating in the session, and selecting clients from the speaking clients; wherein a number of the selected client is no more than a predetermined value; the session notification command comprises information indicating whether the client participating in the session is currently speaking.

* * * * *